US007500125B2

(12) United States Patent
Yasumoto

(10) Patent No.: US 7,500,125 B2
(45) Date of Patent: Mar. 3, 2009

(54) POSITIONING SIGNAL RECEIVING APPARATUS

(75) Inventor: Takuji Yasumoto, Nishinomiya (JP)

(73) Assignee: Furuno Electric Company Limited, Nishinomiya (JP)

( * ) Notice: Subject to any disclaimer, the term of this patent is extended or adjusted under 35 U.S.C. 154(b) by 483 days.

(21) Appl. No.: 11/303,926

(22) Filed: Dec. 19, 2005

(65) Prior Publication Data
US 2006/0149984 A1 Jul. 6, 2006

(30) Foreign Application Priority Data
Dec. 20, 2004 (JP) ............................. 2004-368432

(51) Int. Cl.
G01S 00/00 (2006.01)
H04B 7185/00 (2006.01)
(52) U.S. Cl. ............. 713/322; 342/357.06; 342/357.12; 342/357.13
(58) Field of Classification Search ................. 713/322; 342/357.06, 357.12, 357.13
See application file for complete search history.

(56) References Cited

U.S. PATENT DOCUMENTS

| 5,854,605 | A * | 12/1998 | Gildea .................... 342/357.03 |
| 6,778,135 | B2 * | 8/2004 | Warloe et al. .......... 342/357.12 |
| 6,985,811 | B2 * | 1/2006 | Gronemeyer ............... 701/213 |
| 7,084,810 | B2 * | 8/2006 | Kitatani .................. 342/357.12 |
| 7,148,844 | B2 * | 12/2006 | Salkhi .................... 342/357.12 |
| 7,236,810 | B1 * | 6/2007 | Underbrink et al. ......... 455/574 |
| 7,301,377 | B2 * | 11/2007 | Tanaka et al. ............... 327/113 |
| 7,317,418 | B2 * | 1/2008 | Salkhi .................... 342/357.12 |
| 2005/0145187 | A1 * | 7/2005 | Gray .......................... 119/174 |
| 2006/0195260 | A1 * | 8/2006 | Gronemeyer ............... 701/213 |
| 2008/0094108 | A1 * | 4/2008 | Leon ........................... 327/99 |

FOREIGN PATENT DOCUMENTS

JP 2002-6022 A 1/2002

* cited by examiner

Primary Examiner—Abdelmoniem Elamin
(74) Attorney, Agent, or Firm—Birch, Stewart, Kolasch & Birch, LLP

(57) ABSTRACT

A GPS receiver is alternately switched between sleep conditions under which between sleep conditions under which a temperature-compensated crystal oscillator is shut off for a specific sleep time while a real-time clock section is kept operational and normal operating conditions under which both the temperature-compensated crystal oscillator and the real-time clock section are kept operational. The GPS receiver determines the ratio of the number of pulses of a reference clock signal to the number of pulses of a low-frequency clock signal counted during a specific period of time preceding the sleep time. The GPS receiver estimates a count value which should have been reached by a reference clock counter at the end of the sleep time if the temperature-compensated crystal oscillator continuously generated the reference clock signal based on the number of pulses of the low-frequency clock signal counted during the sleep time.

3 Claims, 9 Drawing Sheets

時間

(a)

(b)

| Sleep INT. [s] | Current I1 [mA] | Pos.FIX Time T2 [ms] | Current I2 [mA] | TX Time T3 [ms] | Current I3 [mA] | Current I4 [mA] | Clock Offset [μs] | Seach Time T1 [ms] | AV. Current [mA] |
|---|---|---|---|---|---|---|---|---|---|
| 1 | 28 | 320 | 19 | 168 | 10 | 1 | 3.74 | 10 | 8.54 |
| 2 | 28 | 320 | 19 | 168 | 10 | 1 | 7.48 | 10 | 4.77 |
| 3 | 28 | 420 | 19 | 168 | 10 | 1 | 11.22 | 15 | 4.16 |
| 4 | 28 | 420 | 19 | 168 | 10 | 1 | 14.96 | 15 | 3.37 |
| 5 | 28 | 520 | 19 | 168 | 10 | 1 | 18.70 | 20 | 3.28 |
| 6 | 28 | 520 | 19 | 168 | 10 | 1 | 22.44 | 20 | 2.90 |
| 7 | 28 | 620 | 19 | 168 | 10 | 1 | 26.18 | 25 | 2.91 |
| 8 | 28 | 620 | 19 | 168 | 10 | 1 | 29.92 | 25 | 2.67 |
| 9 | 28 | 720 | 19 | 168 | 10 | 1 | 33.66 | 30 | 2.70 |
| 10 | 28 | 720 | 19 | 168 | 10 | 1 | 37.40 | 30 | 2.53 |
| 20 | 28 | 900 | 19 | 168 | 10 | 1 | 74.81 | 55 | 1.96 |
| 30 | 28 | 900 | 19 | 168 | 10 | 1 | 112.21 | 80 | 1.66 |
| 40 | 28 | 900 | 19 | 168 | 10 | 1 | 149.62 | 100 | 1.51 |
| 50 | 28 | 900 | 19 | 168 | 10 | 1 | 187.02 | 125 | 1.42 |
| 60 | 28 | 900 | 19 | 168 | 10 | 1 | 224.43 | 150 | 1.36 |

(c)

| Sleep INT. [s] | Current I1 [mA] | Pos.FIX Time T2 [ms] | Current I2 [mA] | TX Time T3 [ms] | Current I3 [mA] | Current I4 [mA] | Clock Offset [μs] | Seach Time T1 [ms] | AV. Current [mA] |
|---|---|---|---|---|---|---|---|---|---|
| 1 | 28 | 320 | 19 | 168 | 10 | 4 | 0 | 5 | 9.93 |
| 2 | 28 | 320 | 19 | 168 | 10 | 4 | 0 | 5 | 6.96 |
| 3 | 28 | 420 | 19 | 168 | 10 | 4 | 0 | 5 | 6.48 |
| 4 | 28 | 420 | 19 | 168 | 10 | 4 | 0 | 5 | 5.86 |
| 5 | 28 | 520 | 19 | 168 | 10 | 4 | 0 | 5 | 5.79 |
| 6 | 28 | 520 | 19 | 168 | 10 | 4 | 0 | 5 | 5.49 |
| 7 | 28 | 620 | 19 | 168 | 10 | 4 | 0 | 5 | 5.49 |
| 8 | 28 | 620 | 19 | 168 | 10 | 4 | 0 | 5 | 5.30 |
| 9 | 28 | 720 | 19 | 168 | 10 | 4 | 0 | 5 | 5.33 |
| 10 | 28 | 720 | 19 | 168 | 10 | 4 | 0 | 5 | 5.19 |
| 20 | 28 | 900 | 19 | 168 | 10 | 4 | 1 | 10 | 4.74 |
| 30 | 28 | 900 | 19 | 168 | 10 | 4 | 1 | 10 | 4.49 |
| 40 | 28 | 900 | 19 | 168 | 10 | 4 | 1 | 10 | 4.37 |
| 50 | 28 | 900 | 19 | 168 | 10 | 4 | 1 | 10 | 4.29 |
| 60 | 28 | 900 | 19 | 168 | 10 | 4 | 1 | 10 | 4.25 |

POSITIONING SIGNAL RECEIVING APPARATUS

CROSS REFERENCE OF RELATED APPLICATION

Japanese Patent Application Tokugan No. 2004-368432 is hereby incorporated by reference.

BACKGROUND OF THE INVENTION

1. Field of the Invention

The present invention relates to a positioning signal receiving apparatus for receiving a plurality of positioning signals and determining the location of a point of signal reception.

2. Description of the Related Art

Conventionally, a positioning signal receiving apparatus, such as a GPS receiver for receiving signals transmitted by the Global Positioning System (GPS), receives radio waves transmitted from a plurality of positioning satellites, obtains GPS time and pseudo-ranges from a point of signal reception to the individual positioning satellites based on the phase of Coarse Acquisition (C/A) code, navigation messages, and so on superimposed on the radio waves, and determines the position of the point of signal reception from the locations of and the pseudo-ranges to the individual positioning satellites as well as time in a geodetic datum in which the positioning signal receiving apparatus is located.

Typically, this kind of GPS receiver continuously performs position fixing operation with the GPS receiver kept always powered on. In the case of a mobile positioning apparatus powered by a small-capacity battery or a positioning apparatus for conducting fixed-point observations using a combination of a solar cell and a secondary battery, for example, it is common practice to intermittently operate the apparatus by turning on the power only when it is necessary to obtain a position fix and turning off the power after obtaining the position fix to achieve as long an operating time as possible.

Under conditions where the positioning signal receiving apparatus is powered off, an internal counter of the receiving apparatus is not in operation. Therefore, at least a few seconds to a few tens of seconds are needed for the receiving apparatus to search for satellites, track carrier phases of satellite signals and acquire satellite information after power-on. Therefore, intermittent operation of the positioning signal receiving apparatus is associated with a problem that the apparatus can not quickly restart position fixing after power-on.

There exist conventionally known approaches to enabling a GPS receiver to estimate GPS time with high accuracy and quickly restart position fixing after power-on during intermittent operation. One such approach is to shut down a radio-frequency (RF) converter for receiving satellite signals and a digital signal processing circuit or mask (suspend) a clock signal of a central processing unit (CPU) to reduce power consumption while keeping a reference clock signal generator and a reference clock counter for estimating GPS time of the GPS receiver operational.

For example, Japanese Patent Application Publication No. 2002-6022 describes a method used in a GPS receiver, in which a reference clock signal generator used for estimating GPS time and a low-frequency clock signal generator used for measuring the lapse of "idle" (or "sleep") time (during which the GPS receiver is not in full operation) and counting local time independently of the reference clock signal generator are kept operating even during the sleep time. The GPS receiver exactly estimates Week Number and Time of Week included in GPS time from clock pulses generated by the low-frequency clock signal generator used for local time determination.

In a case where the GPS receiver is operated intermittently as mentioned above, accuracy of estimating GPS time greatly depends on accuracy of the frequency of a clock signal generated during the sleep time. Conventional GPS receivers measure the lapse of sleep time by using a high-frequency oscillator which oscillates at a higher frequency than the aforementioned low-frequency clock signal generator, such as a temperature-compensated crystal oscillator which oscillates at a high frequency of 16.368 MHz, for instance, to satisfy the need for estimating GPS time with higher accuracy.

Generally, there is a positive correlation between oscillating frequency and power consumption of an oscillator. For example, the aforementioned temperature-compensated crystal oscillator which oscillates at such a high frequency as 16.368 MHz draws an electric current of approximately a few milliamperes, whereas a crystal oscillator with no temperature compensation which oscillates at a low frequency (e.g., 32 kHz) draws only a few hundred microamperes or less. It is therefore understood that a positioning signal receiving apparatus operated intermittently by using a high-frequency oscillator consumes a larger amount of electric power than a positioning signal receiving apparatus operated intermittently by using a low-frequency oscillator which oscillates at a relatively low frequency.

It is needed for the GPS receiver to estimate GPS time with high accuracy and quickly restart position fixing upon restoration of normal operation from sleep conditions as mentioned above. If the GPS receiver is operated intermittently by using a temperature-compensated crystal oscillator which oscillates at a high frequency to estimate GPS time with high accuracy immediately after power-on, however, there arises a problem that the GPS receiver draws a large amount of electric current even during the sleep time, thereby diminishing power consumption effect of the intermittent operation.

SUMMARY OF THE INVENTION

Accordingly, it is an object of the invention to solve the aforementioned problems of the prior art and provide a positioning signal receiving apparatus which can be operated intermittently with reduced power consumption and quickly restart position fixing upon restoration of normal operation from sleep conditions.

A positioning signal receiving apparatus of the invention includes a reference clock signal generator, a reference clock counter, a low-frequency clock signal generator, a positioning signal receiving section, a positioning signal processor, an intermittent operation controller, a count ratio determiner and a reference clock count value interpolator. The reference clock signal generator generates a first clock signal used as a reference clock signal in processing a positioning signal. The reference clock counter counts successive pulses of the first clock signal. The low-frequency clock signal generator supplies a second clock signal generated independently of the first clock signal, the second clock signal having a lower frequency than the first clock signal. The positioning signal receiving section receives the positioning signal. The positioning signal processor establishes a position fix by processing the positioning signal. The intermittent operation controller alternately switches the positioning signal receiving apparatus between sleep conditions under which the reference clock signal generator is shut off for a specific sleep time while the low-frequency clock signal generator is kept operational and normal operating conditions under which both the reference clock signal generator and the low-frequency clock signal generator are kept operational. The count ratio determiner determines the ratio of the number of pulses of the first clock signal to the number of pulses of the second clock signal counted during a specific period of time preceding the sleep time. The reference clock count value interpolator calculates the number of pulses of the first clock signal which should have been counted during the sleep time if the reference clock signal generator continuously generated the first clock signal from the number of pulses of the second clock signal counted during the sleep time and estimates a count value which should have been reached by the reference clock counter at the end of the sleep time by using the number of pulses of the first clock signal which should have been counted during the sleep time.

In the positioning signal receiving apparatus thus configured, the intermittent operation controller shuts off the reference clock signal generator in the sleep time, so that the reference clock signal generator does not draw any current and electric power is consumed mostly by a current drawn by the low-frequency clock signal generator and a leak current drawn by semiconductor devices of the positioning signal processor during the sleep time.

Also, the count ratio determiner and the reference clock count value interpolator work together to compensate for deviation of the frequency of the low-frequency clock signal generator which is lower than the frequency of the reference clock signal. This makes it possible to reduce the influence of one factor of GPS time estimation error.

According to one feature of the invention, the aforementioned specific period of time during which the number of pulses of the first clock signal and the number of pulses of the second clock signal are counted immediately precedes the sleep time, and the reference clock count value interpolator obtains the number of pulses of the first clock signal which should have been counted during the sleep time if the reference clock signal generator continuously generated the first clock signal by multiplying the number of pulses of the second clock signal counted during the sleep time by the ratio of the number of pulses of the first clock signal to the number of pulses of the second clock signal counted during the specific period of time.

This feature of the invention makes it possible to automatically cancel out the deviation of the frequency of the low-frequency clock signal generator during the sleep time based on frequency drift thereof observed immediately before the sleep time. Typically, temperature change during the sleep time is so small that the second clock signal (low-frequency clock signal) does not drift in frequency during the sleep time. Therefore, the reference clock can be reestablished with high accuracy after the sleep time with this feature of the invention.

According to another feature of the invention, the positioning signal receiving apparatus further includes a reference clock count value corrector for estimating a code phase of the positioning signal corresponding to a calculated range from a satellite transmitting the positioning signal to a point of signal reception based on time kept by the positioning signal receiving apparatus corresponding to the count value of the reference clock counter and orbit information contained in the positioning signal, calculating deviation of the estimated code phase from a code phase derived from observation of the positioning signal, and correcting the count value of the reference clock counter by as much as the amount of offset corresponding to the deviation of the estimated code phase upon restoration of normal operating conditions from sleep conditions.

This feature of the invention makes it possible to correct the count value of the reference clock counter with high accuracy immediately after the sleep time by obtaining the correct code phase from observation of the positioning signal upon restoration of normal operating conditions from sleep conditions.

According to another feature of the invention, the positioning signal processor includes a position fixing section for establishing the position fix by processing positioning signals received from a plurality of satellites and determining time in a geodetic datum in which the positioning signal receiving apparatus is located, the positioning signal receiving apparatus further including a reference clock count value corrector for calculating deviation of time kept by the positioning signal receiving apparatus corresponding to the count value of the reference clock counter from the time in the geodetic datum determined by the position fixing section, and correcting the count value of the reference clock counter by as much as the amount of offset corresponding to the deviation of the time kept by the positioning signal receiving apparatus upon restoration of normal operating conditions from sleep conditions.

This feature of the invention makes it possible to correct the count value of the reference clock counter with high accuracy immediately after the sleep time by obtaining pseudo-ranges upon restoration of normal operating conditions from sleep conditions.

According to still another feature of the invention, the positioning signal receiving apparatus further includes a control command receiving section having a serial input port for receiving a control command transmitted from an external device. The control command receiving section executes a sequence of bringing the reference clock signal generator back to normal operating conditions upon detecting a start bit of the control command and becomes ready to receive a meaningful control code contained in the control command upon completion of the sequence of bringing the reference clock signal generator back to normal operating conditions, wherein the meaningful control code is contained in a bit string which follows a specific number of bits from the beginning of the control command.

The positioning signal receiving apparatus thus configured can quickly restore normal operating conditions and provide a position fix upon receiving a control command from the external device whenever necessary. If the period of time required for receiving the aforementioned specific number of bits from the beginning of the control command before receiving the meaningful control code is made longer than the period of time required for the positioning signal receiving apparatus to execute the sequence of restoring normal operating conditions, the external device which transmits the control command need not consider the period of time required for the positioning signal receiving apparatus to become ready to receive the control command upon completing the sequence of restoring normal operating conditions. Accordingly, the external device can bring the positioning signal receiving apparatus back to normal operating conditions by simply transmitting a control command regardless of whether the positioning signal receiving apparatus is currently under normal operating conditions or sleep conditions.

It will be appreciated from the foregoing and the following detailed description that the invention provides a positioning signal receiving apparatus which can be operated intermittently with reduced power consumption and quickly restart position fixing upon restoration of normal operation from sleep conditions.

These and other objects, features and advantages of the invention will become more apparent upon reading the following detailed description along with the accompanying drawings.

DETAILED DESCRIPTION OF THE PREFERRED EMBODIMENTS OF THE INVENTION

Figure 1:
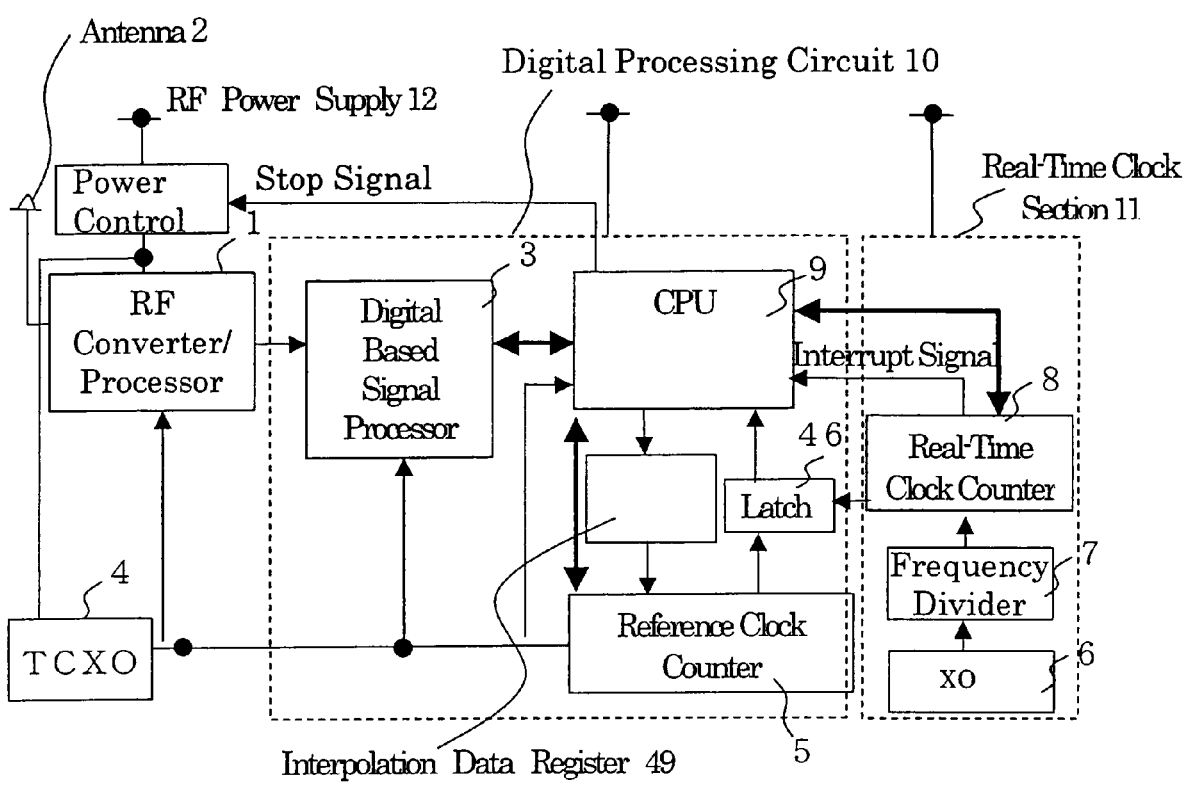
FIG. 1 is a block diagram of a GPS receiver according to a preferred embodiment of the invention.

A GPS receiver according to a preferred embodiment of the invention is now described with reference to the accompanying drawings, of which FIG. 1 is a block diagram of the GPS receiver of the preferred embodiment.

Referring to FIG. 1, the GPS receiver includes an RF converter/processor 1, an antenna 2, a digital baseband signal processor 3, a temperature-compensated crystal oscillator (TCXO) 4, a reference clock counter 5, a crystal oscillator (XO) 6, a frequency divider 7, a real-time clock (RTC) counter 8 and a CPU 9.

The RF converter/processor 1 converts a signal received by the antenna 2 into an intermediate frequency (IF) signal and then into a digital signal. The digital baseband signal processor 3 generates information used for detecting C/A code phase and carrier phase by processing this digital signal. The temperature-compensated crystal oscillator 4 serving as a reference clock signal generator generates a 16.3678 MHz reference clock signal and the reference clock counter 5 counts successive pulses of this reference clock signal.

On the other hand, the crystal oscillator 6 constituting part of a low-frequency clock signal generator oscillates at a frequency of 32.768 kHz and outputs a 32.768 kHz clock signal. The frequency divider 7 converts this 32.768 kHz clock signal into a 1.04 kHz clock signal by dividing the original frequency of 32.768 kHz by a factor of 32. The crystal oscillator 6 and the frequency divider 7 together constitute the low-frequency clock signal generator. The real-time clock counter 8 determines current time by counting successive pulses of the frequency-divided 1.04 kHz clock signal and outputs an interrupt signal to the CPU 9 with specific timing.

The CPU 9 detects the aforementioned C/A code phase and carrier phase and controls the phase of C/A code and the frequency and phase of a carrier generated in the digital baseband signal processor 3 to enable tracking of the C/A code phase and the carrier phase. Also, the CPU 9 interprets navigation messages, detects start timing of each subframe, obtains GPS time, calculates pseudo-ranges from the GPS receiver to multiple satellites using a set of C/A code phases and carrier phases, and determines the position of the GPS receiver (the point of signal reception). Additionally, the CPU 9 successively corrects count values of reference clock and low-frequency clock and determines time in a geodetic datum in which the GPS receiver is located (hereinafter referred to as the receiver datum time).

As shown in FIG. 1, the crystal oscillator 6, the frequency divider 7 and the real-time clock counter 8 together constitute a real-time clock section 11 for counting the current time. While the low-frequency clock signal generator uses the crystal oscillator 6 provided in the real-time clock section 11 in the present embodiment, the GPS receiver (positioning signal receiving apparatus) may be provided with an external circuit (outside the receiver unit) for generating a low-frequency clock signal.

A reference clock count value interpolator for estimating the reference clock count value of the reference clock counter 5 upon restoration of normal operation from sleep conditions (under which the GPS receiver is not in full operation) is now described with reference to FIG. 2, in which Rm, Rn, Rw (represented by Rx) are count values of the real-time clock counter 8 at times m, n, w (represented by x), and Bm, Bn, Bw (represented by Bx) are count values of the reference clock counter 5 at times m, n, w. Tb and Tr shown in FIG. 2 designate clock count intervals of the reference clock counter 5 and the real-time clock counter 8, respectively. During a specific period of time (n–m) elapsed from time m to time n, the reference clock counter 5 increments its count value from Bm to Bn while the real-time clock counter 8 increments its count value from Rm to Rn.

While the real-time clock counter 8 counts (Rn–Rm) pulses of the 1.04 kHz clock signal output from the frequency divider 7 during the aforementioned specific period of time, the reference clock counter 5 counts (Bn–Bm) pulses of the 16.3678 MHz reference clock signal. Thus, the ratio of the number of reference clock pulses counted by the reference clock counter 5 to the number of low-frequency clock pulses counted by the real-time clock counter 8 is calculated as follows:

$$k=(Bn-Bm)/(Rn-Rm) \tag{1}$$

Figure 2:
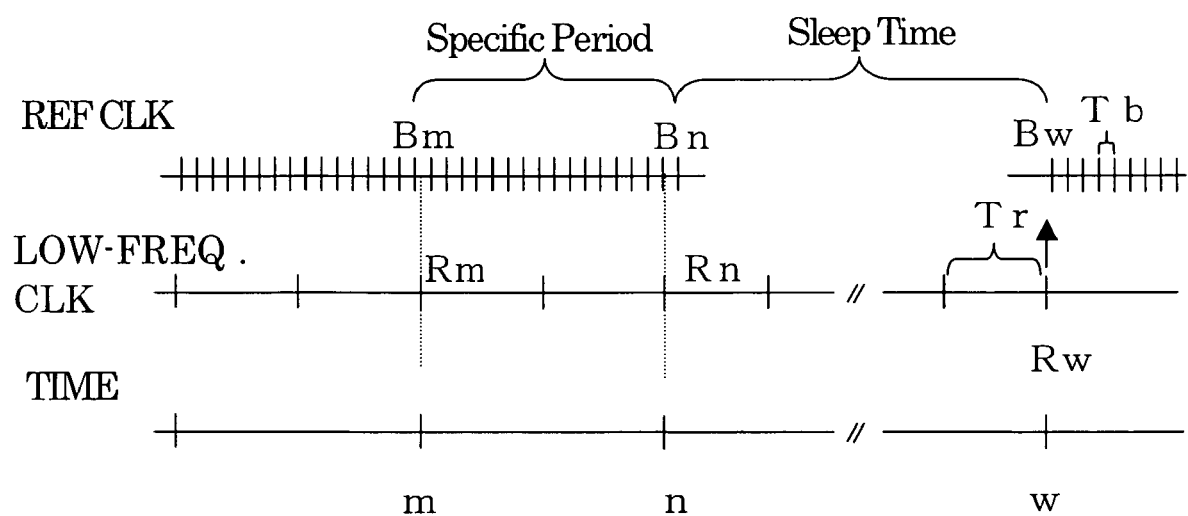
FIG. 2 is a timing chart showing how a reference clock counter and a real-time clock counter count respective clock pulses.

During sleep time shown in FIG. 2, the temperature-compensated crystal oscillator 4 does not oscillate and the reference clock counter 5 does not count reference clock pulses. Specifically, the CPU 9 outputs a stop signal to shut off an RF power supply 12 at time n, causing the temperature-compensated crystal oscillator 4 to stop generating the reference clock signal. At time w the CPU 9 invalidates the stop signal and, at this point, the RF power supply 12 supplies power to the temperature-compensated crystal oscillator 4, causing the temperature-compensated crystal oscillator 4 to generate again the reference clock signal. The reference clock count value Bw that should be obtained by the reference clock counter 5 at time w if the reference clock pulses were generated even during the sleep time can be estimated by incrementing the count value of the reference clock counter 5 obtained at time n by a value obtained by multiplying the number of clock pulses counted by the real-time clock counter 8 by the aforementioned ratio k as follows:

$$Bw = k(Rw-Rn) + Bn \quad (2)$$

The ratio k of equation (1) represents the number of reference clock pulses counted by the reference clock counter 5 while the real-time clock counter 8 counts one pulse of the low-frequency clock signal. The number of clock pulses which would be counted by the reference clock counter 5 if the reference clock pulses were generated even during the sleep time can be estimated by multiplying the number of clock pulses (Rw−Rn) counted by the real-time clock counter 8 during the sleep time by the ratio k. Then, the reference clock count value Bw which should be obtained by the reference clock counter 5 at time w when the GPS receiver restores normal operation can be estimated by adding the value k(Rw−Rn) to the reference clock count value Bn obtained immediately before the sleep time, as indicated by equation (2) above. The reference clock count value Bw thus obtained is substituted for the previous count value Bn of the reference clock counter 5 when the GPS receiver restores normal operation from sleep conditions. It is appreciated from the above discussion that the GPS receiver of this embodiment can reduce the influence of initial frequency deviation and temperature variations caused by drift of the low-frequency clock by using the value k calculated by equation (1) immediately before the sleep time.

Now, a reference clock count value corrector of the GPS receiver for correcting the count value of the reference clock counter 5 based on observation of the phase of C/A code superimposed on a positioning signal received from a GPS satellite upon restoration of normal operation.

Upon restoration of normal operation from sleep conditions, the GPS receiver of the present embodiment observes C/A code phases when determining pseudo-ranges to individual satellites. At the same time, the GPS receiver calculates ranges to the individual satellites from orbit information thereof and time determined from the count value of the reference clock counter 5, and estimates the C/A code phases of the individual satellites. Since the accuracy of the reference clock generated by the temperature-compensated crystal oscillator 4 is sufficiently high and variations in reference clock frequency are extremely small, influence of clock frequency variations on the estimated C/A code phases is usually negligible. Therefore, deviation of the estimated C/A code phase from the observed C/A code phase of each satellite can be regarded as being caused by variations in the low-frequency clock signal generated by the crystal oscillator 6.

As deviation occurs between the estimated and observed C/A code phases as mentioned above, the reference clock count value corrector determines the number of reference clock pulses corresponding to the C/A code phase deviation generated by the temperature-compensated crystal oscillator 4, corrects the count value of the reference clock counter 5 by as much as the number of reference clock pulses corresponding to the C/A code phase deviation, and substitutes the count value thus corrected for the previous count value of the reference clock counter 5. The number of reference clock pulses corresponding to the C/A code phase deviation is also used for correcting the aforementioned value k of equation (1).

Specifically, the value k is corrected as follows. The number of reference clock pulses corresponding to the aforementioned C/A code phase deviation counted by the reference clock counter 5 can be regarded as substantially equivalent to a value obtained by multiplying the amount of deviation of the low-frequency clock during the sleep time by the value k, the amount of deviation of the low-frequency clock being expressed in terms of the number of low-frequency clock pulses counted by the real-time clock counter 8. It is possible to correct the value of k by determining the amount of deviation of the low-frequency clock per unit time. Expressing the count value of the reference clock counter 5 obtained from the observed C/A code phase by Bp' and the count value of the reference clock counter 5 corrected by the low-frequency clock by Bp, the amount of deviation D of the count value of the reference clock counter 5 is given by equation (3) below:

$$D = Bp' - Bp \quad (3)$$

Also, the amount of deviation d of the low-frequency clock per unit time is given by equation (4) below:

$$d = D(Rw - Rn) \quad (4)$$

The value of k used at a next cycle of sleep time (intermittent operation) is corrected by the amount of deviation d of the low-frequency clock per unit time as follows:

$$k' = k + d \quad (5)$$

Upon restoration of normal operation from sleep conditions in the next cycle of sleep time, the GPS receiver uses the value k' of equation (5) above instead of the aforementioned value k of equation (1) to compensate for the deviation of the low-frequency clock during the sleep time so that the reference clock count value interpolator can estimate (interpolate) the reference clock count value of the reference clock counter 5 with higher precision.

While the GPS receiver of the present embodiment corrects the count value of the reference clock counter 5 based on the observed C/A code phase as discussed above, the count value of the reference clock counter 5 may be corrected based on the receiver datum time established simultaneously with a position fix obtained with a plurality of satellites. In the latter case, the GPS receiver uses equation (3') below instead of the aforementioned equation (3) in determining the amount of deviation of the count value of the reference clock counter 5:

$$D = Bx - By \quad (3')$$

where Bx is the count value of the reference clock counter 5 corresponding to receiver datum time x obtained from the GPS position fix and By is the count value of the reference clock counter 5 corrected by the low-frequency clock during the sleep time.

It is possible to compensate for the deviation of the low-frequency clock by the GPS position fix obtained with a plurality of satellites by using equation (3') instead of equation (3), and thereby estimate (interpolate) the reference clock count value of the reference clock counter 5 with high precision.

Alternatively, the count value of the reference clock counter 5 may be corrected based on a difference between an observable, such as a Doppler shift in frequency of a satellite signal, and an estimated value of the observable. In this way, the count value of the reference clock counter 5 can be corrected with high precision. In this alternative, the GPS receiver uses equation (3") below instead of the aforementioned equation (3) in determining the amount of deviation of the count value of the reference clock counter 5:

$$D = Ba - Bb \quad (3'')$$

where D represents the number of reference clock pulses corresponding to the difference between a Doppler shift derived from observation of a satellite signal and a Doppler shift predicted based on time corrected by the low-frequency clock during the sleep time, Ba is the count value of the reference clock counter 5 corresponding to the Doppler shift derived from observation of the satellite signal, and Bb is the count value of the reference clock counter 5 corresponding to the Doppler shift predicted based on the time corrected by the low-frequency clock during the sleep time.

It is possible to compensate for the deviation of the low-frequency clock by the GPS position fix obtained with a plurality of satellites by using equation (3") instead of equation (3), and thereby estimate (interpolate) the reference clock count value of the reference clock counter 5 with high precision.

Figure 3:
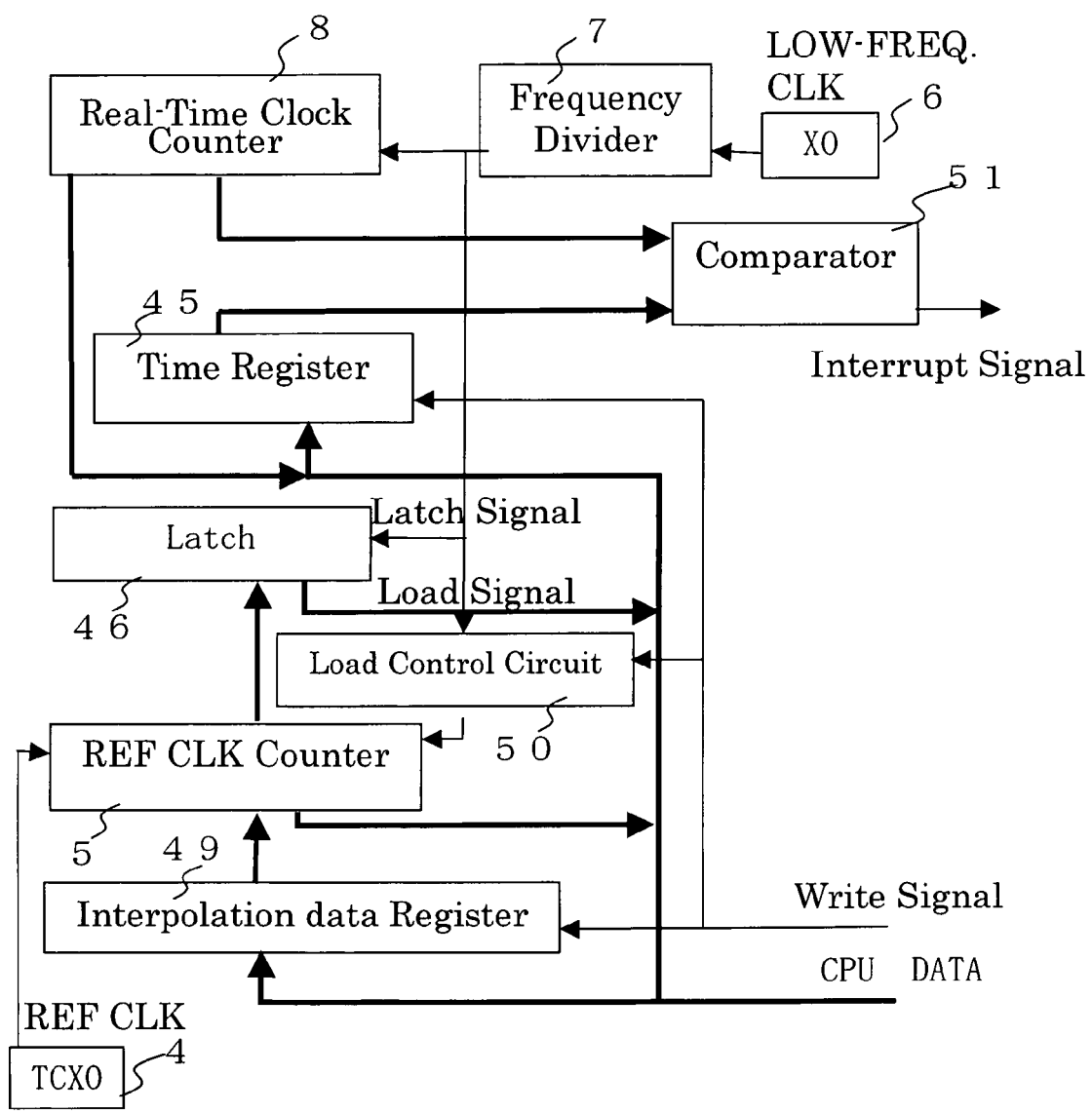
FIG. 3 is a block diagram of a control section of the GPS receiver which enables the GPS receiver to perform intermittent operation.
Figure 4:
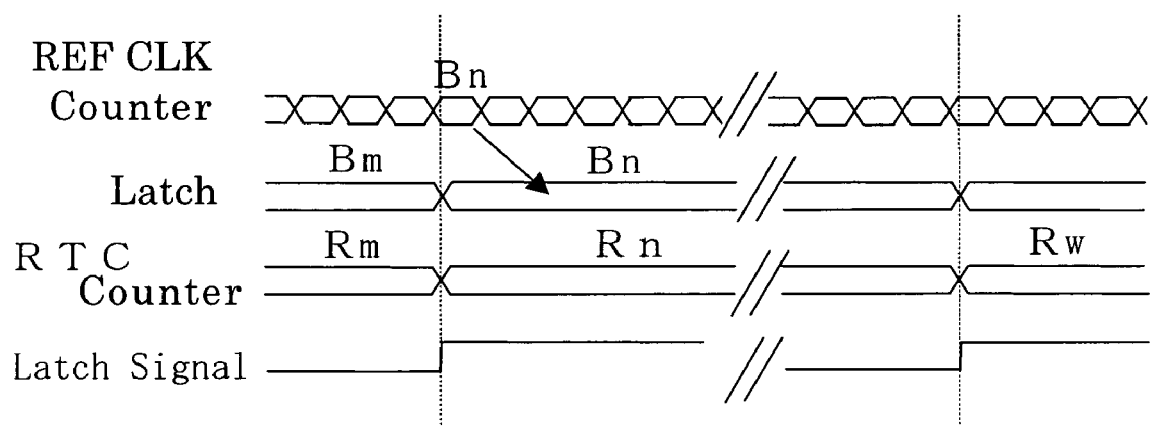
FIG. 4 is a timing chart showing how a latch shown in FIG. 3 latches a reference clock count value of the reference clock counter.
Figure 5:
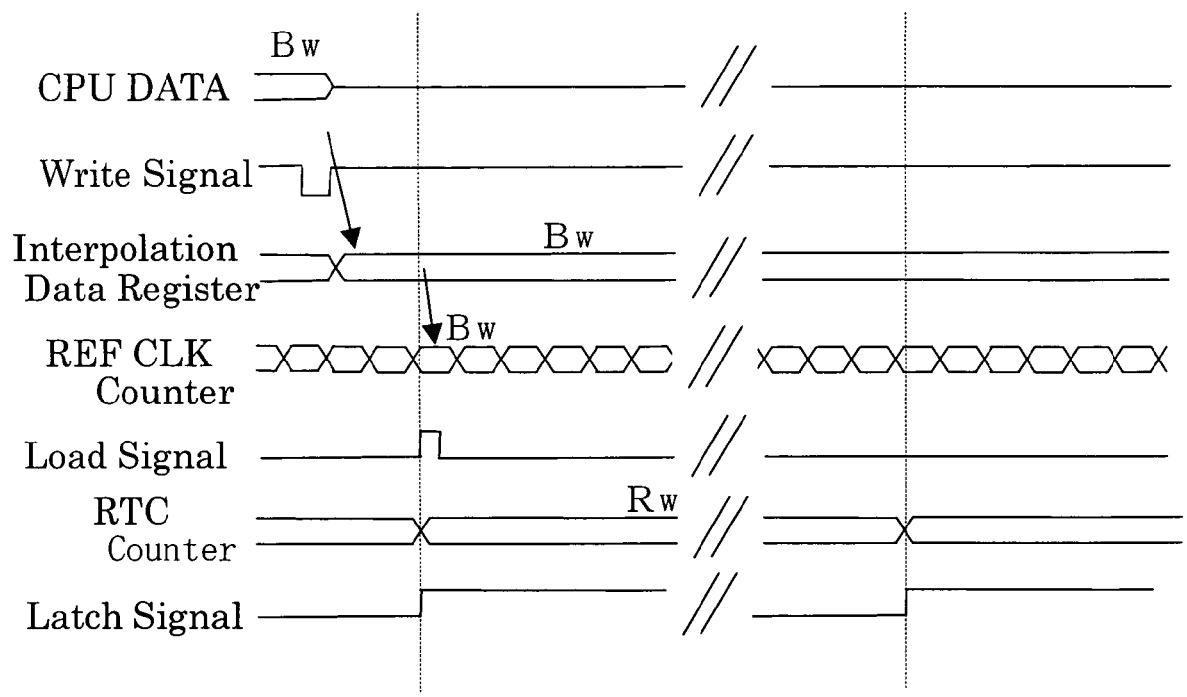
FIG. 5 is a timing chart showing how the previously latched reference clock count value is loaded into the reference clock counter.

The configuration and working of a control section which enables the GPS receiver to perform the intermittent operation is now described with reference to FIGS. 3, 4 and 5, in which FIG. 3 is a block diagram of the control section and FIGS. 4 and 5 are timing charts of various signals.

Referring to FIG. 3, the 32.768 kHz clock signal generated by the crystal oscillator 6 is divided in frequency by the factor of 32 by the frequency divider 7 to produce the 1.04 kHz low-frequency clock signal. The real-time clock counter 8 counts successive pulses of this low-frequency clock signal. On the other hand, while the temperature-compensated crystal oscillator 4 is operational, it generates the 16.3678 MHz reference clock signal and the reference clock counter 5 counts successive pulses of this reference clock signal.

A latch 46 shown in FIG. 3 latches the count value of the reference clock counter 5 at a rising edge of each pulse of the 1.04 kHz low-frequency clock signal output from the frequency divider 7 using the low-frequency clock pulse rising edge as a latch signal. The CPU 9 acquires the count value of the reference clock counter 5 which was valid at a point in time of the low-frequency clock pulse rising edge immediately before by reading the value latched by the latch 46. A time register 45 is a register used for determining time when the GPS receiver should restore normal operation from sleep conditions. The CPU 9 writes normal operation restoration time when the GPS receiver should restore normal operation in the time register 45 before switching the GPS receiver to sleep conditions.

The real-time clock section 11 shown in FIG. 1 continues to operate even when the GPS receiver is under sleep conditions. The real-time clock counter 8 includes a comparator 51 which judges whether the count value of the real-time clock counter 8 has matched the normal operation restoration time stored in the time register 45. When the count value of the real-time clock counter 8 coincides with the normal operation restoration time stored in the time register 45, the comparator 51 outputs the earlier-mentioned interrupt signal to the CPU 9. Upon receiving the interrupt signal, the CPU 9 begins a sequence of bringing the GPS receiver back to normal operation.

When bringing the GPS receiver back to normal operation, the CPU 9 first estimates the reference clock count value Bw which should be obtained by the reference clock counter 5 at time w if the reference clock pulses were generated even during the sleep time by using the aforementioned equation (2) and the CPU 9 writes the reference clock count value Bw thus obtained in a interpolation data register 49. Next, the CPU 9 outputs a write signal to a load control circuit 50. Consequently, the load control circuit 50 transmits the low-frequency clock signal fed from the frequency divider 7 to the reference clock counter 5 as a load signal. The reference clock counter 5 loads the value stored in the interpolation data register 49 at a rising edge of this load signal, whereby the count value of the reference clock counter 5 is reset to a correct value. More specifically, this sequence enables to the GPS receiver to reset the count value of the reference clock counter 5 upon restoration of normal operation to a value approximately equal to the reference clock count value which should have been reached if the reference clock counter 5 had not stopped counting the reference clock pulses generated by the temperature-compensated crystal oscillator 4. This feature of the embodiment serves to increase the accuracy of GPS time estimated by the GPS receiver immediately upon restoration of normal operation.

FIG. 4 is a timing chart showing how the latch 46 latches the count value of the reference clock counter 5. The count value of the reference clock counter 5 is incremented by one at each clock pulse of the temperature-compensated crystal oscillator 4 as shown in FIG. 4. As already mentioned with reference to FIG. 3, the rising edge of the low-frequency clock signal output from the frequency divider 7 is used as the latch signal. The latch 46 latches the count value of the reference clock counter 5 at the rising edge of each pulse of the low-frequency clock signal. As the CPU 9 reads the value held in the latch 46 prior to a next latch timing, the CPU 9 can refer to the count value of the reference clock counter 5 which was valid at the point in time of the low-frequency clock pulse rising edge immediately before.

FIG. 5 is a timing chart showing how the previously latched reference clock count value (interpolation data) is loaded to the reference clock counter 5. Referring to FIG. 5, the CPU 9 loads the interpolation data on a data bus and outputs the write signal to the load control circuit 50, whereby the interpolation data is written in the interpolation data register 49. Upon receiving the write signal, the load control circuit 50 is set in a state to transmit the latch signal to the reference clock counter 5 as a load signal. Thus, when the load signal is transmitted from the load control circuit 50, the count value (interpolation data) previously latched in the interpolation data register 49 is loaded to the reference clock counter 5.

When the write signal is not input from the CPU 9, the load control circuit 50 does not transmit the load signal, so that the value stored in the interpolation data register 49 is not written in the reference clock counter 5. This enables the reference clock counter 5 to correctly count the reference clock pulses.

Figure 6:
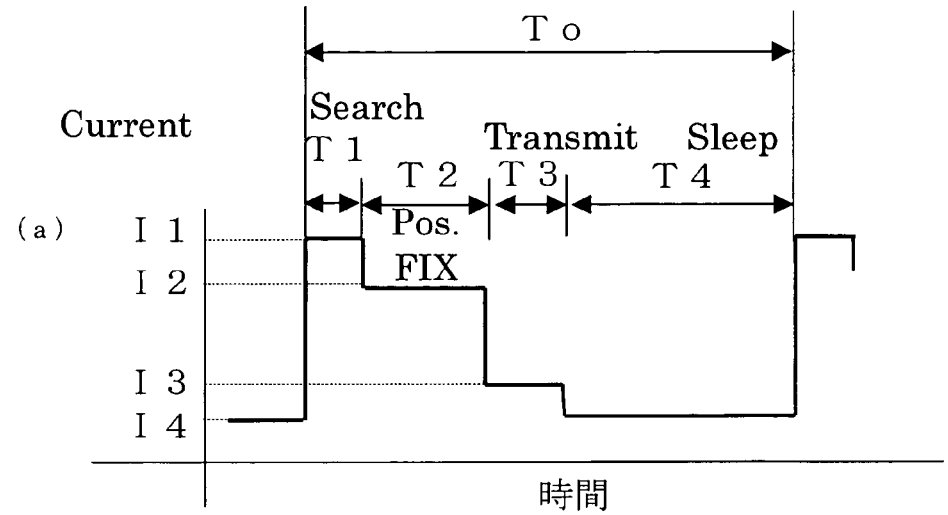
FIGS. 6A, 6B and 6C show a mathematical model indicating how the amount of electric current flowing into the GPS receiver varies during intermittent operation, the amounts of average currents flowing into the GPS receiver of the embodiment during intermittent operation, and the amounts of average currents flowing into a GPS receiver of the prior art during intermittent operation, respectively.
Figure 7:
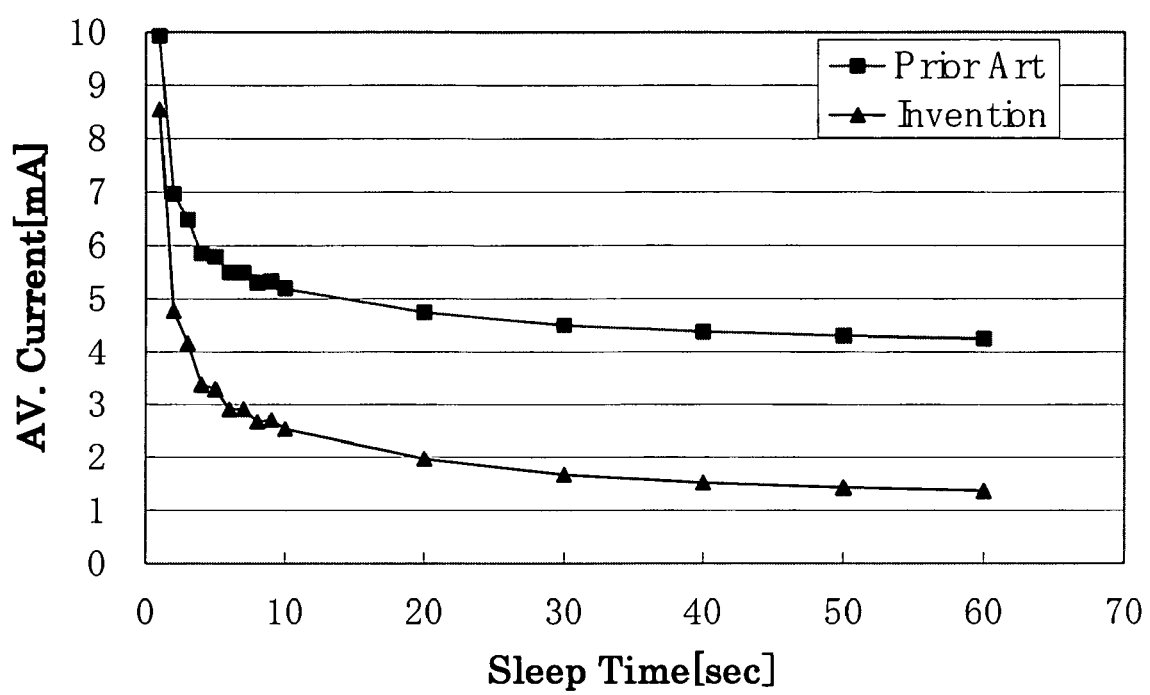
FIG. 7 is a graphical representation of the average currents flowing into the GPS receives of the embodiment and the prior art.

Referring now to FIGS. 6A, 6B, 6C and 7, power consumption characteristics of the GPS receiver of the present embodiment and that of the earlier-mentioned prior art (Japanese Patent Application Publication No. 2002-6022) are described. Shown in FIG. 6A is a mathematical model indicating how the amount of electric current flowing into the GPS receiver varies during intermittent operation. FIG. 6B shows the amounts of average currents that flow into the GPS receiver of the embodiment in different stages of the intermittent operation in which the temperature-compensated crystal oscillator 4 (reference clock signal generator) is shut off during the sleep time, and FIG. 6C shows the amounts of average currents that flow into the GPS receiver of the prior art in different stages of the intermittent operation in which the reference clock signal generator is kept operating even during the sleep time. FIG. 7 is a graphical representation of the average currents shown in FIGS. 6B and 6C.

In the following discussion, it is assumed that the temperature-compensated crystal oscillator constituting the reference clock signal generator oscillates at 16.368 MHz and draws 4 mA and the crystal oscillator constituting part of the low-frequency clock signal generator oscillates at 32 kHz and draws 1 mA in both the GPS receiver of the embodiment and the GPS receiver of the prior art.

Referring to FIG. 6A, the GPS receiver which performs the aforementioned intermittent operation draws current I1 during a period of time (search time) T1 when the GPS receiver searches for satellite signals, current I2 during a period of time T2 when the GPS receiver performs position fixing operation, current I3 during a period of time T3 when the GPS receiver transmits data on the position fixing results to a data collecting station by radio, for example, and current I4 during a period of time (sleep time) T4 when the GPS receiver is under sleep conditions. The sum of these time periods T1, T2, T3, T4 is referred to as sleep interval To.

"Clock offset" shown in FIGS. 6B and 6C is the amount of deviation of the count value reestablished in the reference clock counter 5 upon restoration of normal operation from sleep conditions from a count value which should have been reached if the temperature-compensated crystal oscillator 4 had been kept continuously operational.

A comparison of the amounts of average currents indicated in FIGS. 6B and 6C reveals that the search time T1 in the GPS receiver of the embodiment is longer than that in the GPS receiver of the prior art. This is because the amount of clock offset in the GPS receiver of the embodiment is longer than in the GPS receiver of the prior art. Also, the current I4 flowing into the GPS receiver of the embodiment during the sleep time T4 is smaller than that flowing into the GPS receiver of the prior art. This is because only the real-time clock section including the low-frequency crystal oscillator 6 which draws a small amount of current is kept operational during the sleep time T4.

In the GPS receiver of the embodiment, the temperature-compensated crystal oscillator 4 serving as the reference clock signal generator is shut off during the sleep time T4. Accordingly, part of the current I4 flowing into a digital processing circuit 10 (refer to FIG. 1) during the sleep time T4 can be reduced, wherein the digital processing circuit 10 is a circuit including the digital baseband signal processor 3, the reference clock counter 5, the CPU 9, the latch 46 and the interpolation data register 49 that operates with the reference clock signal. This arrangement of the embodiment serves to greatly reduce power consumption during the sleep time T4. It should be appreciated from the foregoing discussion that the invention makes it possible to provide a GPS receiver which can be operated intermittently with reduced overall power consumption as compared to the GPS receiver of the prior art.

In the GPS receiver of the embodiment thus far described, the larger the sleep interval To, the larger the clock offset, resulting in an increase in search time. However, the amount of increase in search time is extremely small compared to the sleep interval To. Even if the GPS receiver is held under sleep conditions for one minute, for example, the GPS receiver requires a search time of only 1.5 seconds. This 1.5-second search time is short enough from a practical point of view and, accordingly, it is appreciated that the GPS receiver of the embodiment has the ability to quickly restart position fixing upon restoration of normal operation from sleep conditions.

In the aforementioned example of the preferred embodiment, the CPU 9 reverts to normal operating conditions with a timer-controlled interrupt fed from the real-time clock counter 8 (refer to FIG. 1). The CPU 9 may be brought back to normal operating conditions by a signal fed from an external device. An example of such a system is described in the following with reference to FIGS. 8 and 9.

Figure 8:
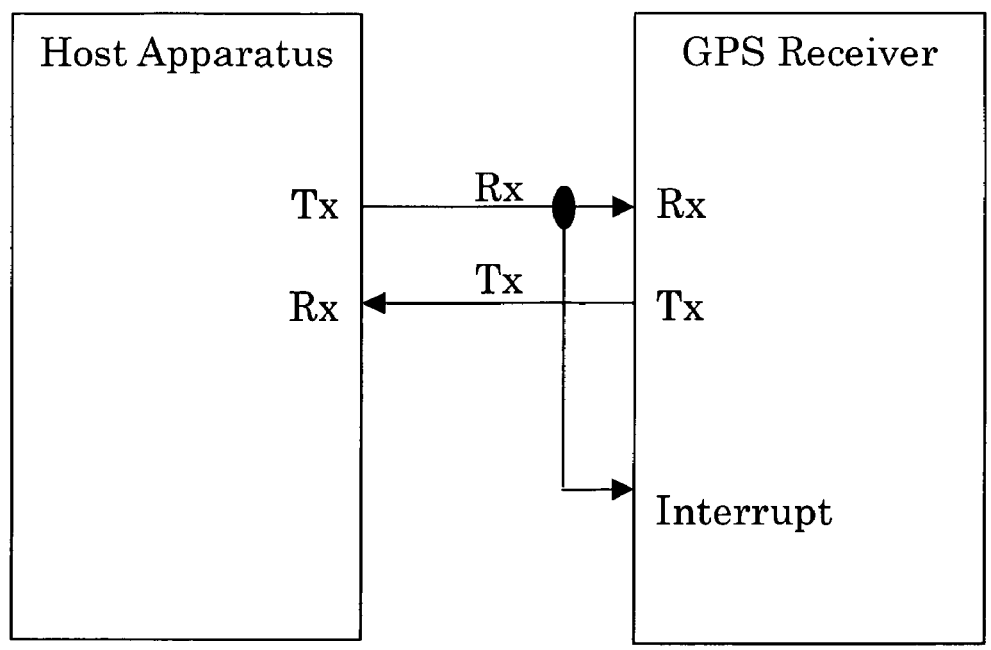
FIG. 8 is a diagram showing a system including a GPS receiver according to another embodiment of the invention and a host apparatus connected thereto.
Figure 9:
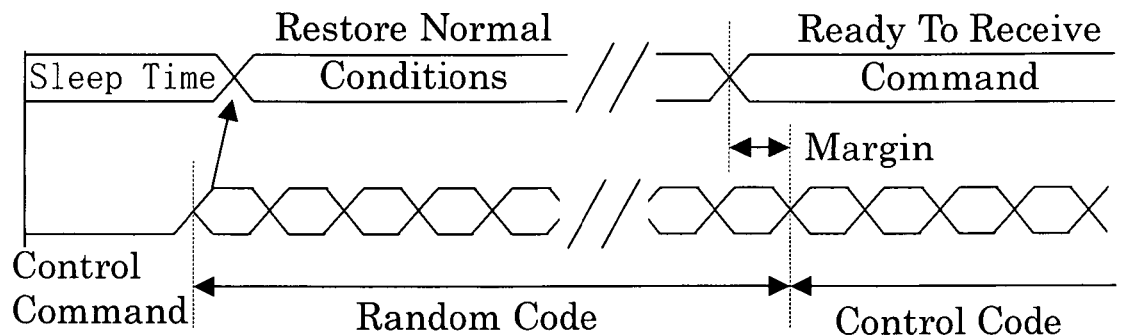
FIG. 9 is a diagram showing how conditions of the GPS receiver of FIG. 8 vary with a control command fed from the host apparatus.

FIG. 8 is a diagram showing a system including a GPS receiver according to another embodiment of the invention and a host apparatus connected thereto, and FIG. 9 is a diagram showing how conditions of the GPS receiver of FIG. 8 vary with a control command fed from the host apparatus.

As shown in FIG. 8, the GPS receiver and the host apparatus are interconnected by a serial data line. The GPS receiver includes a control signal receiving circuit for receiving an external command signal which performs the same function as the interrupt signal output from the real-time clock counter 8 to the CPU 9 in the GPS receiver of FIG. 1. When the control signal receiving circuit of the GPS receiver receives a control command from the host apparatus under sleep conditions, the GPS receiver restores normal operation through a specific sequence.

A meaningful control code is contained in a bit string that follows a specific number of bits from the beginning of each control command transmitted from the host apparatus. The number of these specific bits preceding the meaningful control code is determined such that a period of time during which these preceding bits are exchanged between the host apparatus and the GPS receiver becomes equal to the sum of time required for the GPS receiver to complete the sequence of restoring normal operation and a specific margin of time. This arrangement of the embodiment makes it unnecessary for the host apparatus to examine current conditions of the GPS receiver (i.e., whether the GPS receiver is under sleep conditions or normal operating conditions) or to determine a period of time required for the GPS receiver to become ready to receive a new command upon completing the sequence of restoring normal operation. The aforementioned specific number of bits from the beginning of the control command may be written as a random code as depicted in FIG. 9.

The meaningful control code transmitted from the host apparatus is preceded by a code made up of the aforementioned specific number of bits of which data size is determined in consideration of the period of time required for the GPS receiver to complete the sequence of restoring normal operation and become ready to interpret the control code and data transfer rate as described above. This arrangement of the embodiment makes it possible to easily configure a system including a GPS receiver without the provision of a control line or a control circuit dedicated exclusively to reverting the GPS receiver to normal operation from sleep conditions.

What is claimed is:

1. A positioning signal receiving apparatus comprising:
   a reference clock signal generator for generating a first clock signal used as a reference clock signal in processing a positioning signal;
   a reference clock counter for counting successive pulses of the first clock signal;
   a low-frequency clock signal generator for supplying a second clock signal generated independently of the first clock signal, the second clock signal having a lower frequency than the first clock signal;
   a positioning signal receiving section for receiving said positioning signal;
   a positioning signal processor for establishing a position fix by processing the positioning signal;
   an intermittent operation controller for alternately switching said positioning signal receiving apparatus between sleep conditions under which said reference clock signal generator is shut off for a specific sleep time while said low-frequency clock signal generator is kept operational and normal operating conditions under which both said reference clock signal generator and said low-frequency clock signal generator are kept operational;
   a count ratio determiner for determining the ratio of the number of pulses of the first clock signal to the number of pulses of the second clock signal counted during a specific period of time preceding the sleep time; and
   a reference clock count value interpolator for calculating the number of pulses of the first clock signal which should have been counted during the sleep time if said reference clock signal generator continuously generated the first clock signal from the number of pulses of the second clock signal counted during the sleep time and estimating a count value which should have been reached by said reference clock counter at the end of the sleep time by using the number of pulses of the first clock signal which should have been counted during the sleep time; and a reference clock count value corrector for estimating a code phase of the positioning signal corresponding to a calculated range from a satellite transmitting the positioning signal to a point of signal reception based on time kept by said positioning signal receiving apparatus corresponding to the count value of said reference clock counter and orbit information contained in the positioning signal, calculating deviation of the estimated code phase from a code phase derived from observation of the positioning signal, and correcting the count value of said reference clock counter by as much as the amount of offset corresponding to the deviation of the estimated code phase upon restoration of normal operating conditions from sleep conditions, wherein said specific period of time during which the number of pulses of the first clock signal and the number of pulses of the second clock signal are counted immediately precedes the sleep time, and said reference clock count value interpolator obtains the number of pulses of the first clock signal which should have been counted during the sleep time if said reference clock signal generator continuously generated the first clock signal by multiplying the number of pulses of the second clock signal counted during the sleep time by the ratio of the number of pulses of the first clock signal to the number of pulses of the second clock signal counted during said specific period of time.

2. A positioning signal receiving apparatus comprising:

a reference clock signal generator for generating a first clock signal used as a reference clock signal in processing a positioning signal;

a reference clock counter for counting successive pulses of the first clock signal;

a low-frequency clock signal generator for supplying a second clock signal generated independently of the first clock signal, the second clock signal having a lower frequency than the first clock signal;

a positioning signal receiving section for receiving said positioning signal;

a positioning signal processor for establishing a position fix by processing the positioning signal;

an intermittent operation controller for alternately switching said positioning signal receiving apparatus between sleep conditions under which said reference clock signal generator is shut off for a specific sleep time while said low-frequency clock signal generator is kept operational and normal operating conditions under which both said reference clock signal generator and said low-frequency clock signal generator are kept operational;

a count ratio determiner for determining the ratio of the number of pulses of the first clock signal to the number of pulses of the second clock signal counted during a specific period of time preceding the sleep time; and a reference clock count value interpolator for calculating the number of pulses of the first clock signal which should have been counted during the sleep time if said reference clock signal generator continuously generated the first clock signal from the number of pulses of the second clock signal counted during the sleep time and estimating a count value which should have been reached by said reference clock counter at the end of the sleep time by using the number of pulses of the first clock signal which should have been counted during the sleep time;

wherein said specific period of time during which the number of pulses of the first clock signal and the number of pulses of the second clock signal are counted immediately precedes the sleep time, and said reference clock count value interpolator obtains the number of pulses of the first clock signal which should have been counted during the sleep time if said reference clock signal generator continuously generated the first clock signal by multiplying the number of pulses of the second clock signal counted during the sleep time by the ratio of the number of pulses of the first clock signal to the number of pulses of the second clock signal counted during said specific period of time, and wherein said positioning signal processor includes a position fixing section for establishing the position fix by processing positioning signals received from a plurality of satellites and determining time in a geodetic datum in which said positioning signal receiving apparatus is located, said positioning signal receiving apparatus further comprising a reference clock count value corrector for calculating deviation of time kept by said positioning signal receiving apparatus corresponding to the count value of said reference clock counter from the time in the geodetic datum determined by said position fixing section, and correcting the count value of said reference clock counter by as much as the amount of offset corresponding to the deviation of the time kept by said positioning signal receiving apparatus upon restoration of normal operating conditions from sleep conditions.

3. The positioning signal receiving apparatus according to one of claims 1 or 2 further comprising a control command receiving section which includes a serial input port for receiving a control command transmitted from an external device, wherein said control command receiving section executes a sequence of bringing said reference clock signal generator back to normal operating conditions upon detecting a start bit of the control command and becomes ready to receive a meaningful control code contained in the control command upon completion of the sequence of bringing said reference clock signal generator back to normal operating conditions, and wherein the meaningful control code is contained in a bit string which follows a specific number of bits from the beginning of the control command.

* * * * *